United States Patent
Muramatsu et al.

(10) Patent No.: US 6,678,742 B1
(45) Date of Patent: Jan. 13, 2004

(54) OBJECT-ORIENTED COMPUTER SYSTEM AND COMPUTER-READABLE STORAGE MEDIUM WHICH STORES PROGRAM

(75) Inventors: Koji Muramatsu, Kawasaki (JP); Yasushi Ono, Kawasaki (JP); Akihisa Sawada, Inagi (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/543,081

(22) Filed: Apr. 4, 2000

(30) Foreign Application Priority Data

Apr. 5, 1999 (JP) .......................... 11-097780

(51) Int. Cl.$^7$ .................. G06F 15/163; G06F 9/00; G06F 9/54
(52) U.S. Cl. .................. 709/310; 717/103
(58) Field of Search .................. 709/310; 717/103

(56) References Cited

U.S. PATENT DOCUMENTS 5,430,876 A * 7/1995 Schreiber et al. .......... 709/328
5,822,585 A * 10/1998 Noble et al. .............. 709/316

FOREIGN PATENT DOCUMENTS

JP 9-62523 3/1997

OTHER PUBLICATIONS

Mezini, Maintaining the Consistency of Class Libraries During Their Evolution, Oct. 1997, ACM.*
MacIntyre, Language–Level Support for Exploratory Programming of Distributed Virtual Environments, 1996, ACM.*

* cited by examiner

Primary Examiner—John Follansbee
Assistant Examiner—Diem Cao
(74) Attorney, Agent, or Firm—Finnegan, Henderson, Farabow, Garrett & Dunner, L.L.P.

(57) ABSTRACT

An object-oriented computer system includes a server-side class library for generating a server-side object which relays a processing request from an application on the server side to the client side, a client-side class library for generating a client-side object which actually executes processing on the basis of the processing request relayed by the server-side object, and an object generation section which, when the server-side object is generated using the server-side class library by executing the application, generates the client-side object.

14 Claims, 15 Drawing Sheets

OBJECT-ORIENTED COMPUTER SYSTEM 40

OBJECT-ORIENTED COMPUTER SYSTEM AND COMPUTER-READABLE STORAGE MEDIUM WHICH STORES PROGRAM

CROSS-REFERENCE TO RELATED APPLICATIONS

This application is based upon and claims the benefit of priority from the prior Japanese Patent Application No. 11-097780, filed Apr. 5, 1999, the entire contents of which are incorporated herein by reference.

BACKGROUND OF THE INVENTION

The present invention relates to an object-oriented computer system which distributes a program generated using an object-oriented language to a plurality of computers and operating the program, and a computer-readable storage medium which stores a program.

A distributed program executed by a client/server system is made of a program distributed to a client or server and executed to realize a predetermined function. An example of the distributed program is a program with a program main body provided in a server and a display section provided in a client.

Generally, when a distributed program is to be generated using an object-oriented language, an application program (to be referred to as an "application" hereinafter. An application is a program having a specific function. Processing itself in executing an application is called a process) is generated by explicitly separating a server-side program and a client-side program at the stage of application generation.

A conventional distributed program generation method will be described in detail. Conventionally, first, an application developer designs contents to be processed by a server-side program, contents to be processed by a client-side program, contents of message exchange between the server program and the client-side program, and a protocol for actually transferring the message exchange contents between the server-side program and the client-side program. In accordance with this design, the application developer develops a program.

However, the above-described development method of separately generating the server-side program and client-side program has the following problems.

As the first problem, to separately generate the server-side program and client-side program at the stage of application generation, the application developer must develop the program consciously of matters such as the operation on the server side, operation on the client side, and synchronization between them.

Thus program development requires labors and is complex in procedure.

As the second problem, to confirm the operation of the developed application, the server-side program and client-side program must be simultaneously operated.

This operation confirmation requires time and labor.

As the third problem, if an error is detected by operation confirmation, it can hardly be traced backed to a bug in the server-side program, a bug in the client-side program, an error in the operation timing between them, or a simple communication error.

BRIEF SUMMARY OF THE INVENTION

It is an object of the present invention to provide an object-oriented computer system with which, in developing a distributed program using an object-oriented language, an application developer can develop the distributed program without being conscious of the discrimination between the server and the client, and a computer-readable storage medium which stores a program.

According to the first aspect of the present invention, there is provided an object-oriented computer system comprising:

a server-side class library which is applied to generate a server-side object which relays a processing request from an application program on a server to a client, the server-side class library being linked to the application program and compatible with an existing library which can be linked to the application program, wherein the application program is an undistributed program being developed by an application developer;

a client-side class library which is applied to generate a client-side object which actually executes processing on the basis of the processing request relayed by the server-side object, the client-side class library inheriting the existing library; and an object generation section which, when the server-side object is generated by applying the server-side class library and executing the application program, generates the client-side object by applying the client-side class library corresponding to the generated server-side object.

According to this arrangement, when execution of processing is requested from the application to the server-side object, execution of processing is further requested from the server-side object to the client-side object, and actual processing is executed by the client-side object.

When processing requests or various information are exchanged between the server-side object and the client-side object, the operation executed by the server can be partially executed by the client even when the application is not developed as a distributed program.

Hence, processing executed on the server side can be easily distributed.

In addition, in developing a new application which is to be operated upon being distributed, the application developer need only describe an application that operates as a stand-alone application.

The application developer need not design/develop a program being conscious of the discrimination between a server program and a client program. For this reason, the processes and labors in development can be reduced, and the operation can be prevented from becoming complex.

The operation of the object-oriented computer system according to the first aspect of the present invention can be confirmed only by confirming the operation of the application, resulting in a decrease in labors in operation confirmation.

If an error is detected in operation confirmation of the object-oriented computer system according to the first aspect of the present invention, it can easily be traced back to a bug in the application.

According to the second aspect of the present invention, there is provided an object-oriented computer system, in which a server and client are connected through a network, comprising:

a server-side class library which is used to generate a server-side object that transmits a generation request of an object corresponding to the server-side object and executes relay of a processing request to the object corresponding to the server-side object, and which is linked to an application program executed by the server;

a client-side class library which is used to generate a client-side object that executes processing on the basis of the processing request relayed by the server-side object corresponding to the client-side object; and an object generation section for receiving the generation request transmitted when the server-side object is generated, and generating the client-side object on the basis of the generation request using the client-side class library.

According to this arrangement, in addition to the effects obtained by the object-oriented computer system of the first aspect of the present invention, the server-side object which entrusts processing to the client side and the client-side object which accepts processing entrusted from the server side and executes the processing on the client side correspond in a one-to-one correspondence. Hence, management is facilitated.

According to the third aspect of the present invention, the server-side class library of the first or second aspect is compatible with a predetermined library which can be linked to the application program.

This provides the following effect in addition to the effects obtained by the object-oriented computer system of the first or second aspect of the present invention.

More specifically, in the object-oriented computer system according to the present invention, a server-side class library which has an interface equivalent to an existing library linked to the application and entrusts the actual operation to the client side is provided.

In this arrangement, the operation on the server side having the application can be partially executed on the client side only by simple correction, e.g., linking the server-side class library to the application.

Hence, correction necessary for operating the stand-alone application as a distributed program can be simplified, and labors in program development can be reduced.

According to the fourth aspect of the present invention, there is provided an object-oriented computer system of the first or second aspect of the present invention, which further comprises a distribution section on the server side, which executes processing of sending message contents from the server-side object to the client-side object to the network and processing of acquiring message contents from the client-side object to the server-side object from the network and distributing the message contents to the corresponding server-side object.

This provides the following effect in addition to the effects obtained by the object-oriented computer system of the first or second aspect of the present invention.

More specifically, in the object-oriented computer system according to the present invention, the server-side distribution section sends message contents from the server-side object to the network. In addition, the server-side distribution section acquires message contents from the client-side object from the network.

Messages can be transmitted/received between objects by making only the server-side distribution section visible from the network. In this case, all objects need not always be visible from the network.

Hence, the amount of processing of making the server-side input and output ports for messages exchanged between objects visible from the network can be decreased.

According to the fifth aspect of the present invention, there is provided an object-oriented computer system of the first or second aspect of the present invention, which further comprises a table for managing a server-side object and a client-side object corresponding to the server-side object in association with each other, and a distribution section on the server side, which executes processing of sending message contents from the server-side object to the client-side object to the network and processing of acquiring message contents from the client-side object to the server-side object from the network and distributing the message contents to the corresponding server-side object, on the basis of management contents of the table.

This provides the following effect in addition to the effects obtained by the first or second aspect of the present invention.

Assume that the server-side object and client-side object, which correspond to each other, are assigned the same identifier and managed by the table, and this identifier is appended to message contents exchanged between the objects.

The correspondence between the server-side object and the client-side object can be recognized. For this reason, distribution by the server-side distribution section is facilitated, and management/exclusive processing can be easily executed.

According to the sixth aspect of the present invention, there is provided an object-oriented computer system of the first or second aspect of the present invention, which further comprises a distribution section on the client side, which executes processing of sending message contents from the client-side object to the server-side object to the network and processing of acquiring message contents from the server-side object to the client-side object from the network and distributing the message contents to the corresponding client-side object.

This provides the following effect in addition to the effects obtained by the first or second aspect of the present invention.

In the object-oriented computer system according to the present invention, all objects need not always be visible from the network on the client side.

Hence, the amount of processing of making the client-side input and output ports for messages exchanged between objects visible from the network can be decreased.

According to the seventh aspect of the present invention, there is provided an object-oriented computer system of the first or second aspect of the present invention, which further comprises a table for managing a server-side object and a client-side object corresponding to the server-side object in association with each other, and a distribution section on the client side, which executes processing of sending message contents from the client-side object to the server-side object to the network and processing of acquiring message contents from the server-side object to the client-side object from the network and distributing the message contents to the corresponding client-side object, on the basis of management contents of the table.

According to this arrangement, in addition to the effects obtained by the first or second aspect of the present invention, distribution by the client-side distribution section is facilitated, and management/exclusive processing can be easily executed.

According to the eighth aspect of the present invention, there is provided an object-oriented computer system of the first or second aspect of the present invention, which further comprises a change processing requesting section for notifying, from the client-side object through the network, the server side of only an execution request for processing changed on the server side or processing newly added on the server side.

This provides the following effect in addition to the effects obtained by the first or second aspect of the present invention.

In the object-oriented computer system according to the present invention, a processing execution request is transmitted from the client side to the server side for only processing whose contents are changed between the client and the server by, e.g., inheritance, or new processing added to the server side. For an execution request for another processing, the processing is executed on the client side.

For an event that has occurred on the client side when processing need not be executed on the server side, the processing is executed on the client side.

This prevents an execution request of unnecessary processing from being executed through the network, increases the processing speed, simplifies processing, and prevents heavy load from being imposed on the network.

According to the ninth aspect of the present invention, there is provided an object-oriented computer system of the first or second aspect of the present invention, wherein the client-side class library is generated using a predetermined processing group, and the system further comprises a post-use processing request section for, when one processing of the predetermined processing group is requested in processing by the application program, requesting the client side to execute the requested processing.

As the predetermined processing group used to construct the client-side class library, for example, an existing library can be applied. In addition, when the client-side class library inherits the existing library, the predetermined processing group can be used.

According to this arrangement, in addition to the effects obtained by the first or second aspect of the present invention, the client side can be requested to execute processing executable on the client side. Hence, processing can be distributed.

According to the 10th aspect of the present invention, there is provided an object-oriented computer system of the fourth aspect of the present invention, which further comprises a distribution section on the client side, which executes processing of sending message contents from the client-side object to the server-side object to the network and processing of acquiring message contents from the server-side object to the client-side object from the network and distributing the message contents to the corresponding client-side object.

According to this arrangement, in addition to the effect obtained by the fourth aspect of the present invention, all objects need not always be visible from the network not only on the server side but also on the client side.

Hence, on both the server and client sides, the amount of processing of making the input and output ports for messages exchanged between objects visible from the network can be decreased.

According to the 11th aspect of the present invention, there is provided an object-oriented computer system of the fifth aspect of the present invention, which further comprises a distribution section on the client side, which executes processing of sending message contents from the client-side object to the server-side object to the network and processing of acquiring message contents from the server-side object to the client-side object from the network and distributing the message contents to the corresponding client-side object, on the basis of management contents of the table.

According to this arrangement, in addition to the effect obtained by the fifth aspect of the present invention, distribution by the distribution section is facilitated, and management/exclusive processing can be easily executed even on the client side.

In any one of the object-oriented computer systems of the fourth to 11th aspects, the server-side class library may be compatible with a predetermined library which can be linked to the application program.

The object-oriented computer system of the eighth or ninth aspect may have a server-side distribution section, client-side distribution section, or table.

According to the twelfth aspect of the present invention, there is provided a computer-readable storage medium which stores a program for controlling an object-oriented computer system, comprising:

a server-side class library which is applied to generate a server-side object which relays a processing request from an application program on a server to a client, the server-side class library being linked to the application program and being compatible with an existing library which can be linked to the application program, wherein the application program is an undistributed program being developed by an application developer, a client-side class library which is applied to generate a client-side object which actually executes processing on the basis of the processing request relayed by the server-side object, the client-side class library inheriting the existing library, and an object generation section which, when the server-side object is generated by applying the server-side class library by executing the application program, generates the client-side object applying the client-side class library corresponding to the generated server-side object.

When the storage medium which stores the program of the 12th aspect is used, the above-described functions can be easily added to even a computer system without the above-described functions.

The storage medium of the 12th aspect may have a program for implementing the function of a server-side distribution section or a program for implementing the function of a client-side distribution section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below with reference to the accompanying drawing.

First Embodiment of the Invention

In this embodiment, an object-oriented computer system which generates, on the client side, an object corresponding to a server-side object when the object is generated on the server side by an application will be described.

In this object-oriented computer system, a processing request from the application is relayed by the server-side object and provided to the client-side object, and actual processing is executed by the client-side object.

Figure 1:
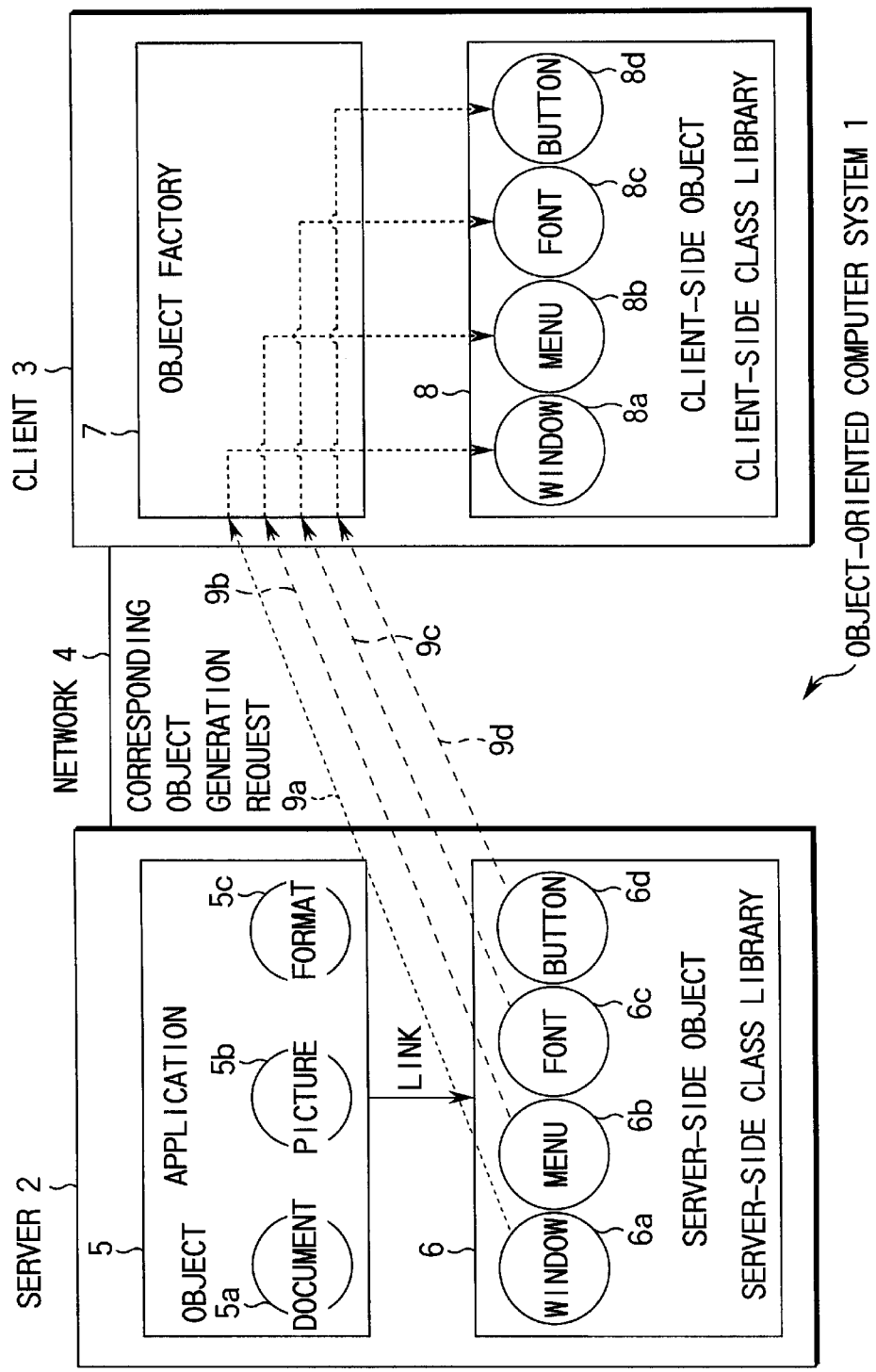
FIG. 1 is a block diagram showing a state when an object is generated in an object-oriented computer system according to the first embodiment of the present invention.

FIG. 1 is a block diagram showing the arrangement of the object-oriented computer system according to the first embodiment of the present invention in generating an object.

An object-oriented computer system 1 is constructed by connecting mainly a server 2 and client 3 through a network 4 such as a LAN or the Internet.

The server 2 has an application 5 and server-side class library 6. The client 3 has an object factory 7 and client-side class library 8.

The arrangement on the server 2 side will be described first.

The application 5 is a program installed in the server 2 and comprises objects 5a to 5c generated on the basis of an application defining class. Assume that the application defining class is defined in the server-side class library 6.

The objects 5a to 5c are components of the application 5 and are, e.g., a document editing object, picture editing object, and format setting object, respectively.

The application 5 provides a predetermined service. As an example, the application 5 herein is a program for operating a computer as a wordprocessor. As another example, the application 5 may be a program for operating a computer as an image viewer. However, the present invention is not limited to these examples.

The application 5 operates upon being linked to the server-side class library 6. Upon being launched, the application 5 generates server-side objects 6a to 6d using the server-side class library 6 and uses them for the operation.

The server-side class library 6 is a class library which defines an object generated in accordance with the operation of the launched application 5. Not only the application defining class but also, e.g., a class for the display section of the application 5 is defined in the server-side class library 6.

As described above, the server-side objects 6a to 6d are generated by the application 5 using the server-side class library 6 upon launching the application 5.

The server-side objects 6a to 6d include processing (method) and also a generation request function of transmitting corresponding object generation requests 9a to 9d to the object factory 7 upon object generation.

The server-side objects 6a to 6d also include a first relay function of transmitting a processing request (method call request) to the client side to request objects 8a to 8d generated on the client 3 side in correspondence with the server-side objects 6a to 6d to perform the actual operation (in this case, display operation), and a second relay function of receiving various information such as return values as the results of requested processing from the client-side objects 8a to 8d and transmitting the information to the application 5.

The server-side objects 6a to 6d also include a function of receiving method call requests from the client-side objects 8a to 8d, respectively, and executing the methods of their own, which are requested by the method call requests, and a function of transmitting various information such as return values obtained by executing the requested processing to the client-side objects 8a to 8d, respectively.

The objects 6a to 6d also include a third relay function of receiving method call requests from the client-side objects 8a to 8d, respectively, and calling the method of the application 5, and a fourth relay function of receiving various information such as return values obtained by executing the method from the application 5 and transmitting the information to the client-side objects 8a to 8d, respectively.

For example, the server-side objects 6a to 6d include relay functions for a window display section, menu display section, font designation section, and button display section, respectively.

The arrangement on the client side will be described next.

The client-side class library 8 is a class corresponding to the class defined in the server-side class library 6 and is constructed by a class for executing the entrusted actual operation (in this case, display operation).

When the application 5 operates and generates the server-side objects 6a to 6d using the server-side class library 6, the object factory 7 generates the client-side objects 8a to 8d corresponding to the generated server-side objects 6a to 6d, respectively. More specifically, the object factory 7 receives the corresponding object generation requests 9a to 9d and generates the client-side objects 8a to 8d corresponding to the server-side objects 6a to 6d using the client-side class library 8 on the basis of the requests.

As described above, the client-side objects 8a to 8d are generated by the object factory 7 using the client-side class library 8 upon activating the application 5.

The client-side objects 8a to 8d actually execute operations on the basis of method calls from the application 5, which are relayed by the server-side objects 6a to 6d, and transmit various information such as return values obtained by the operations to the application 5 through the server-side objects 6a to 6d, respectively.

The client-side objects 8a to 8d also transmit event call requests based on an event that has occurred on the client 3 side to a method of the application 5 or method of any one of the server-side objects 6a to 6d, and receives various information such as return values as a reply.

Figure 2:
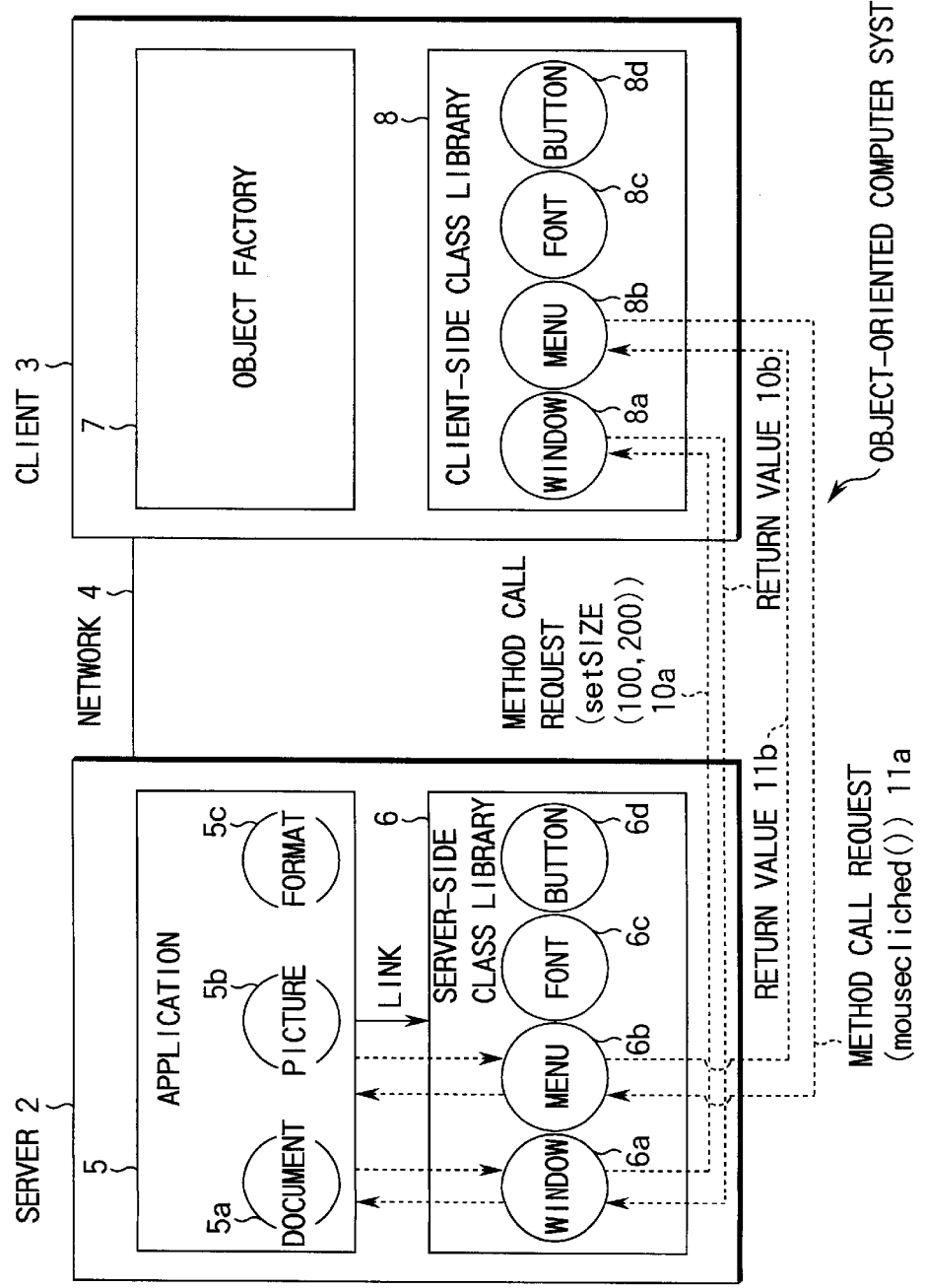
FIG. 2 is a block diagram showing a state when a processing request is generated in the object-oriented computer system according to the first embodiment.

FIG. 2 is a block diagram showing the arrangement of the object-oriented computer system 1 of this embodiment when a processing request is generated. In this example, the application 5 requests, through the server-side object 6a, the client-side object 8a to perform window size setting processing, and the client-side object 8b requests, through the server-side object 6b, the application 5 to execute processing when the mouse button is clicked.

When the application 5 instructs the server-side object 6a to set the window size, the server-side object 6a relays this instruction and transmits a method call request (setSize(100, 200)) 10a to the client-side object 8a.

The client-side object 8a executes actual processing in accordance with the received method call request 10a and transmits a return value 10b to the server-side object 6a. After that, the return value 10b is relayed by the server-side object 6a, and the return value 10b is output to the application 5.

When the user clicks the mouse button, the client-side object 8b transmits a method call request (mouseClicked()) 11a to the server-side object 6b.

The server-side object 6b relays the received method call request 11a and transmits it to the application 5, so the application 5 executes processing. The server-side object 6b relays a return value 11b obtained from the application 5 upon executing processing and transmits the return value 11b to the client-side object 8b.

The operation of the object-oriented computer system 1 according to the first embodiment with the above arrangement will be described below.

Figure 3:
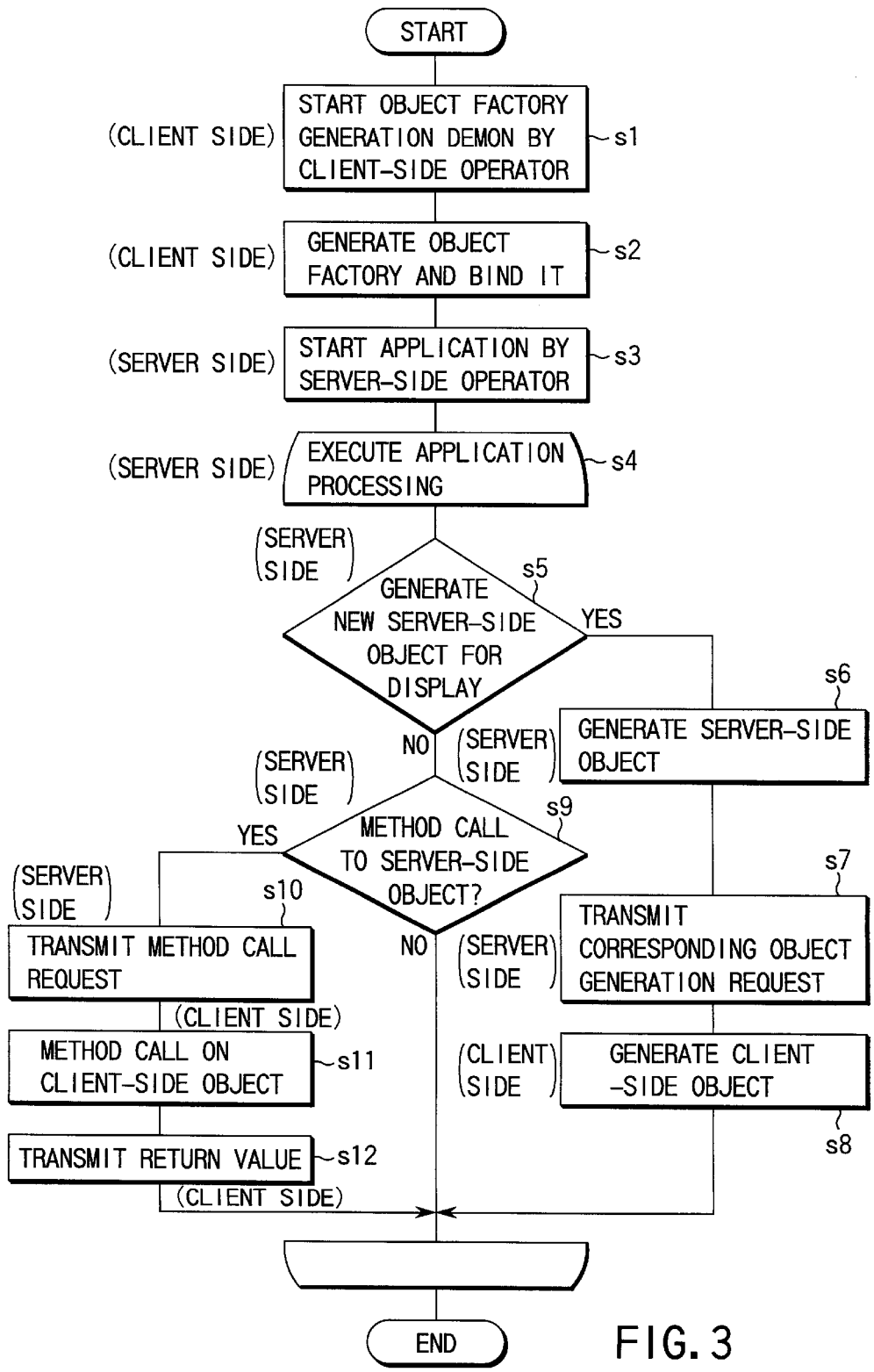
FIG. 3 is a flow chart showing the operation of the object-oriented computer system according to the first embodiment.

FIG. 3 is a flow chart showing the operation of the object-oriented computer system according to the first embodiment.

First, the client-side operator starts an object factory generation demon in the client 3 (s1). The object factory 7 is generated and undergoes binding (s2). Binding generally means that in a machine connected to a network and having an IP address, one of a plurality of port numbers is ensured as an input port of communication of a predetermined program. By binding, all data sent to the bound port number of the machine are transmitted to the predetermined program.

Next, the application 5 is started in the server 2 by the server-side operator, and processing of the application 5 is executed (s3).

During execution of processing of the application 5 (s4), when generation of a new server-side object for display is instructed (s5), the server-side object is generated using the class defined in the server-side class library 6 (s6).

The generated server-side object transmits a corresponding object generation request to the object factory 7 (s7).

Upon receiving the corresponding object generation request, the object factory 7 generates a client-side object using the class defined in the client-side class library 8 (s8).

On the other hand, during execution of processing of the application 5 (s4), when a method included in the server-side object is called from the application 5 (s9), a method is called on a corresponding client-side object through the server-side object (s10) whereby the method of the client-side object is called and executed (s11).

As a consequence, a return value is transmitted from the client-side object to the application 5 through the server-side object (s12).

As described above, in the object-oriented computer system 1 according to this embodiment, the client-side objects 8a to 8d are generated in a one-to-one correspondence with the server-side objects 6a to 6d, respectively. The server-side objects 6a to 6d relay a processing request to the client-side objects 8a to 8d and cause them to execute actual processing.

With this arrangement, processing of the application 5 as undistributed program can be easily distributed, and the operation load on the server 2 can be reduced. In addition, management becomes easy by making the server-side objects 6a to 6d correspond to the client-side objects 8a to 8d in a one-to-one correspondence.

In this embodiment, since the operation of the application 5 in the server 2 is partially performed on the client 3 side, an operation as a distributed program is enabled without separately generating programs on the server 2 and client 3 sides in advance.

For this reason, labors necessary for the development of a distributed program can be reduced, and development is simplified. In addition, since the operation can be confirmed by operating the application 5, operation confirmation is facilitated. Furthermore, if an error is detected by operation confirmation, the cause of this can be easily specified because the application 5 need only be checked.

Second Embodiment

In this embodiment, an object-oriented computer system having not an existing library linked to an application but a server-side class library compatible with an existing library will be described.

Figure 4:
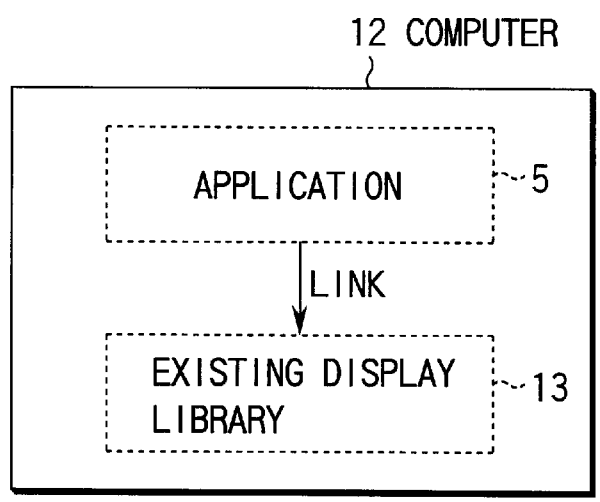
FIG. 4 is a block diagram showing the relationship between an existing library and an application as undistributed program.

FIG. 4 is a block diagram showing the relationship between an existing library and an application as undistributed program. The same reference numerals as in FIGS. 1 and 2 denote the same part in this embodiment. Referring to FIG. 4, an application 5 is installed in a computer 12. The application 5 is used upon being linked to an existing display library 13. The existing display library 13 is a library used to generate an object for executing the display operation of the application 5.

Figure 5:
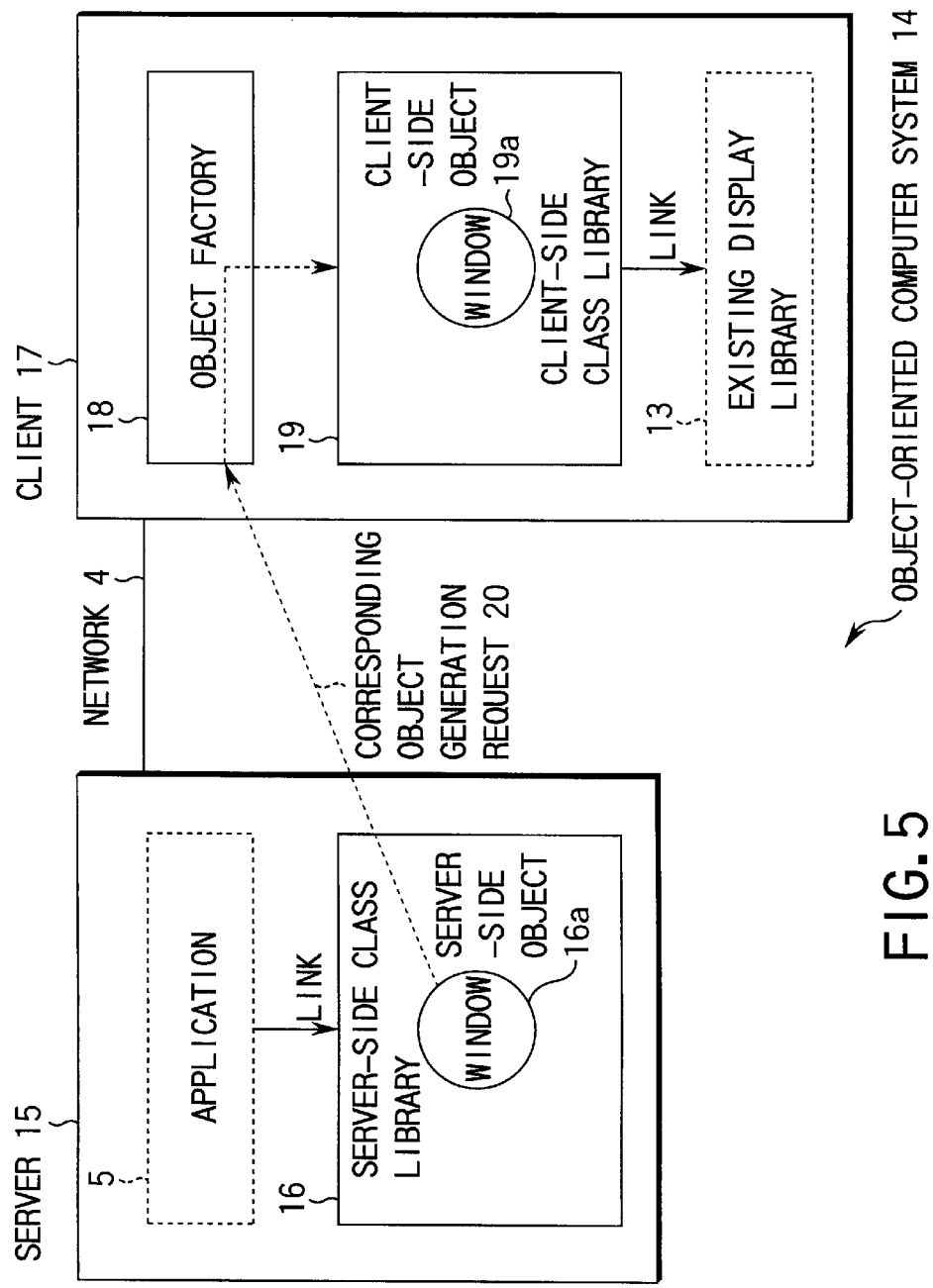
FIG. 5 is a block diagram showing the arrangement of an object-oriented computer system according to the second embodiment of the present invention.

FIG. 5 is a block diagram showing the object-oriented computer system according to this embodiment. This system uses the application 5 as an undistributed program by distributing it.

A server 15 of an object-oriented computer system 14 has the application 5 and a server-side class library 16. A client 17 has the existing display library 13 which normally run on the same machine as that of the application 5, an object factory 18, and a client-side class library 19. The server 15 and client 17 are connected through a network 4.

In the object-oriented computer system 14, the application 5 has the same function as that shown in FIG. 4 except that it is linked not to the existing display library 13 but to the server-side class library 16.

The procedure of link operation of the application 5 with the server-side class library 16 is the same as that of the application 5 with the existing display library 13.

More specifically, the application 5 can view the existing display library 13 and server-side class library 16 in a similar way. When the application 5 uses the server-side class library 16 instead of the existing display library 13, the application 5 need only recognize switching therebetween, and actual change in the application 5 is unnecessary.

The application 5 accesses the server-side class library 16 according to the same procedure as that for the existing display library 13. More specifically, the server-side class library 16 is compatible with the existing display library 13.

The server-side class library 16 has the same function as that of the above-described server-side class library 6. The application 5 generates a server-side object 16a for display using the server-side class library 16.

The generated server-side object 16a transmits a corresponding object generation request 20 to the object factory 18. The server-side object 16a includes a relay function between the application 5 and a client-side object 19a.

The object factory 18 has the same function as that of the above-described object factory 7 except that the object factory 18 also uses the existing display library 13 linked to the client-side class library 19 to generate client-side objects.

The client-side class library 19 is used upon being linked to the existing display library 13 to generate the client-side object 19a for realizing the actual operation in correspondence with the generated server-side object 16a.

In the object-oriented computer system 14 having the above arrangement, the application 5 uses the server-side class library 16 according to the same procedure as that of the operation to the existing display library 13 to generate the server-side object 16a.

Upon generation of the server-side object 16a, the client-side object 19a is generated by the object factory 18 using the client-side class library 19 and existing display library 13 linked to the client-side class library 19.

After that, a method call for display is transmitted to the client-side object 19a through the server-side object 16a, and actual processing is executed on the client 17 side.

As described above, in the object-oriented computer system 14 according to this embodiment, compatibility between the server-side class library 16 and the existing display library 13 is ensured, and the server-side class library 16 is accessed from the application 5 according to the same procedure as that for the existing display library 13. Finally, the actual operation is executed by the client-side object 19a generated using the existing display library.

Hence, in addition to the same function and effect as in the above-described first embodiment, the operations of the existing application 5 and existing display library 13 can be distributed while suppressing any change in the existing state.

This reduces the labors for the development of a distributed program.

Since the actual operation is finally executed by the client-side object 19a generated using the existing display library 13, the same operation state as the normal state can be obtained.

Third Embodiment

In this embodiment, an object-oriented computer system for increasing the efficiency of processing requests between objects will be described.

Figure 6:
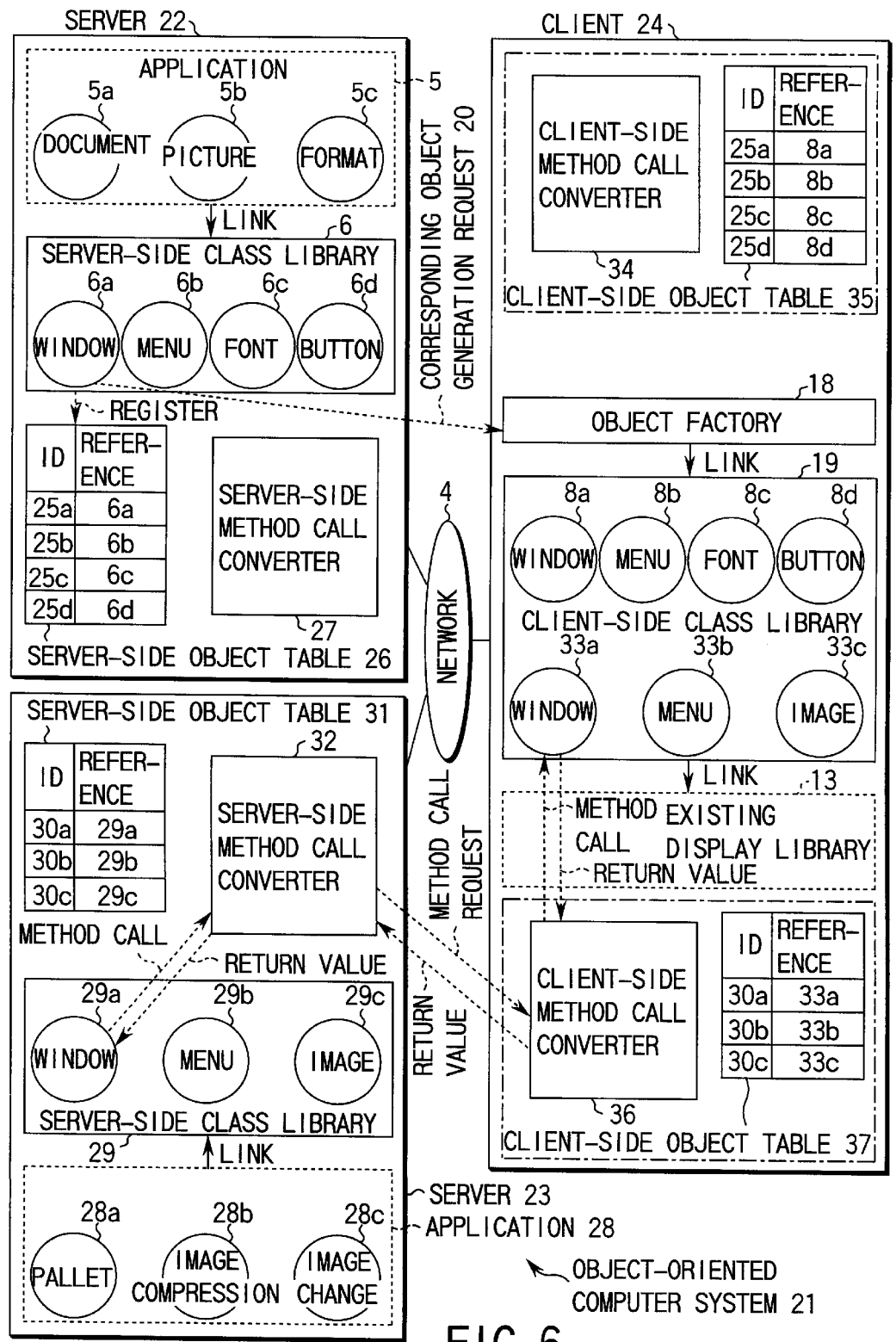
FIG. 6 is a block diagram showing the arrangement of an object-oriented computer system according to the third embodiment of the present invention.

FIG. 6 is a block diagram showing the arrangement of an object-oriented computer system according to this embodiment. The same reference numerals as in the above-described drawings denote the same parts in FIG. 6, and a detailed description thereof will be omitted, or only a brief description will be made. In this case, only different parts will be described in detail.

An object-oriented computer system 21 is constructed by connecting two servers 22 and 23 and client 24 through a network 4 so as to enable transmission/reception.

In the object-oriented computer system 21, various applications generated using an object-oriented language operate. The display sections of these applications are separated from the applications themselves and implemented by a machine different from that for executing the applications themselves.

The server 22 has an application 5 operating as a word-processor.

As described above, this application 5 normally operates upon being linked to an existing display library 13 on one machine. In this embodiment, however, the application 5 is provided in the server 22, and the existing display library 13 is provided in the client 24. The server 22 has, in place of the existing display library 13, a server-side class library 6 compatible with the existing display library 13, and the application 5 operates upon being linked to the server-side class library 6.

The server-side class library 6 is compatible with the existing display library 13 and therefore can be linked, like the existing display library 13.

In this case, the server-side class library 6 and existing display library 13 are compatible. However, the present invention is not limited to this. For example, the server-side class library 6 may be a library having a unique specification and the same function as that of the existing display library. In this case, the link destination of the application 5 must be changed to this server-side class library 6 to reconfigure the system. Except this point, the system arrangement is the same as in the case wherein the server-side class library 6 and existing display library 13 are compatible.

Server-side objects 6a to 6d are objects generated for display of the application 5 and have the same relay function as described above. In this embodiment, identifiers (object IDS) 25a to 25d are assigned to the server-side objects 6a to 6d, respectively, when they are generated.

The object IDs 25a to 25d are stored in a server-side object table 26 in association with the server-side objects 6a to 6d to which the object IDs 25a to 25d are assigned.

In transmitting a corresponding object generation request 20, the server-side objects 6a to 6d append the object IDs assigned to themselves to this corresponding object generation request.

The server-side object table 26 is a table used to acquire a server-side object corresponding to a predetermined object ID. The server-side object table 26 is generated for each application.

A server-side method call converter 27 is a server-side distribution section for receiving all method call requests and return values transmitted from a client-side object to a server-side object. Upon receiving a method call request, the server-side method call converter 27 specifies a server-side object on which the method call is made, on the basis of the object ID added to the received method call request and the contents of the server-side object table 26, and calls the method on the specified server-side object. On the other hand, when a return value is received, the server-side method call converter 27 outputs the return value to a server-side object indicated by an object ID added to the return value.

The server-side method call converter 27 also adds an object ID to a method call from a server-side object to a client-side object by looking up the server-side object table 26, and transmits the method call. Furthermore, the server-side method call converter 27 inputs a return value to be transmitted from a server-side object to a client-side object, appends a corresponding object ID to the return value, and transmits it to the client 24 side.

The server 23 has an application 28 operating as an image viewer.

Like the above-described application 5, the application 28 also normally operates upon being linked to the existing display library 13 on one machine. In this embodiment, however, the application 28 operates upon being linked to a server-side class library 29 compatible with the existing display library 13.

The application 28 is constructed by a pallet object 28a, image compression object 28b, image conversion object 28c, and the like. These objects 28a to 28c are generated on the basis of an application defining class.

The server-side class library 29 is compatible with the existing display library 13 in the relationship with the application 28 and can be linked to the application 28.

Server-side objects 29a to 29c are objects generated for display. Object IDs 30a to 30c are assigned to the generated server-side objects 29a to 29c, respectively.

A server-side object table 31 and server-side method call converter 32 of the server 23 have the same functions as those of the above-described server-side object table 26 and server-side method call converter 27, respectively.

In the client 24, the display sections of the applications 5 and 28 operate.

Client-side objects 8a to 8d are generated by an object factory 18 that has received corresponding object generation requests. The object IDs 25a to 25d added to the corresponding object generation requests are assigned to the generated client-side objects 8a to 8d, respectively.

Client-side objects 33a to 33c are also generated by the object factory 18 that has received corresponding object generation requests. The object IDs 30a to 30c added to the corresponding object generation requests are assigned to the client-side objects 33a to 33c, respectively.

In this embodiment, every time an application is started, a client-side method call converter and a client-side object table are generated in correspondence with the application.

In correspondence with the application 5, a client-side method call converter 34 and client-side object table 35 are generated. In correspondence with the application 28, a client-side method call converter 36 and client-side object table 37 are generated.

The client-side method call converters 34 and 36 have the same function as that of the server-side method call converters 27 and 32, and a detailed description thereof will be omitted.

The client-side object table 35 stores the client-side objects 8a to 8d as the display section of the application 5 and the object IDs 25a to 25d assigned to the client-side objects 8a to 8d, respectively, in association with each other.

The client-side object table 37 stores the client-side objects 33a to 33c as the display section of the application 28 and the object IDs 30a to 30c assigned to the client-side objects 33a to 33c, respectively, in association with each other.

The operation of the object-oriented computer system 21 having the above arrangement will be described below.

First, the operation after launching an application will be described. Next, processing of generating an object will be described. Finally, processing of using the generated object will be described. A description of each processing will be made by exemplifying the application 5. This also applies to the application 28 or other applications.

Figure 7:
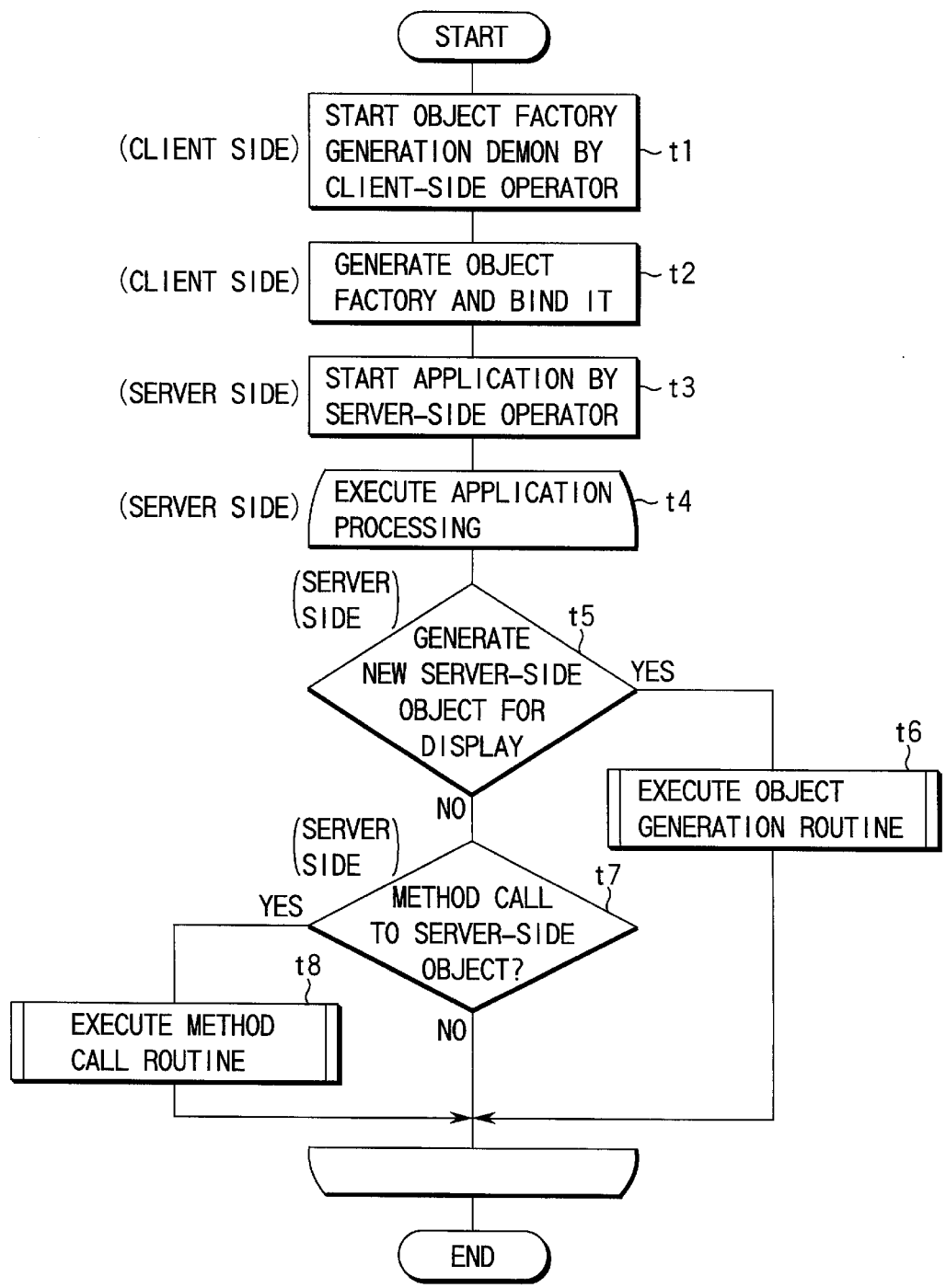
FIG. 7 is a flow chart showing the operation of the object-oriented computer system according to the third embodiment.

FIG. 7 is a flow chart showing the operation of the object-oriented computer system 21 according to this embodiment.

The operation (t1 to t8) executed by the object-oriented computer system 21 is almost the same as that (s1 to s12) of the above-described object-oriented computer system 1 except for processing of an object-generation routine (t6) executed to generate a new server-side object for display and processing of a method call routine (t8) executed to call a method on a server-side object.

Figure 8:
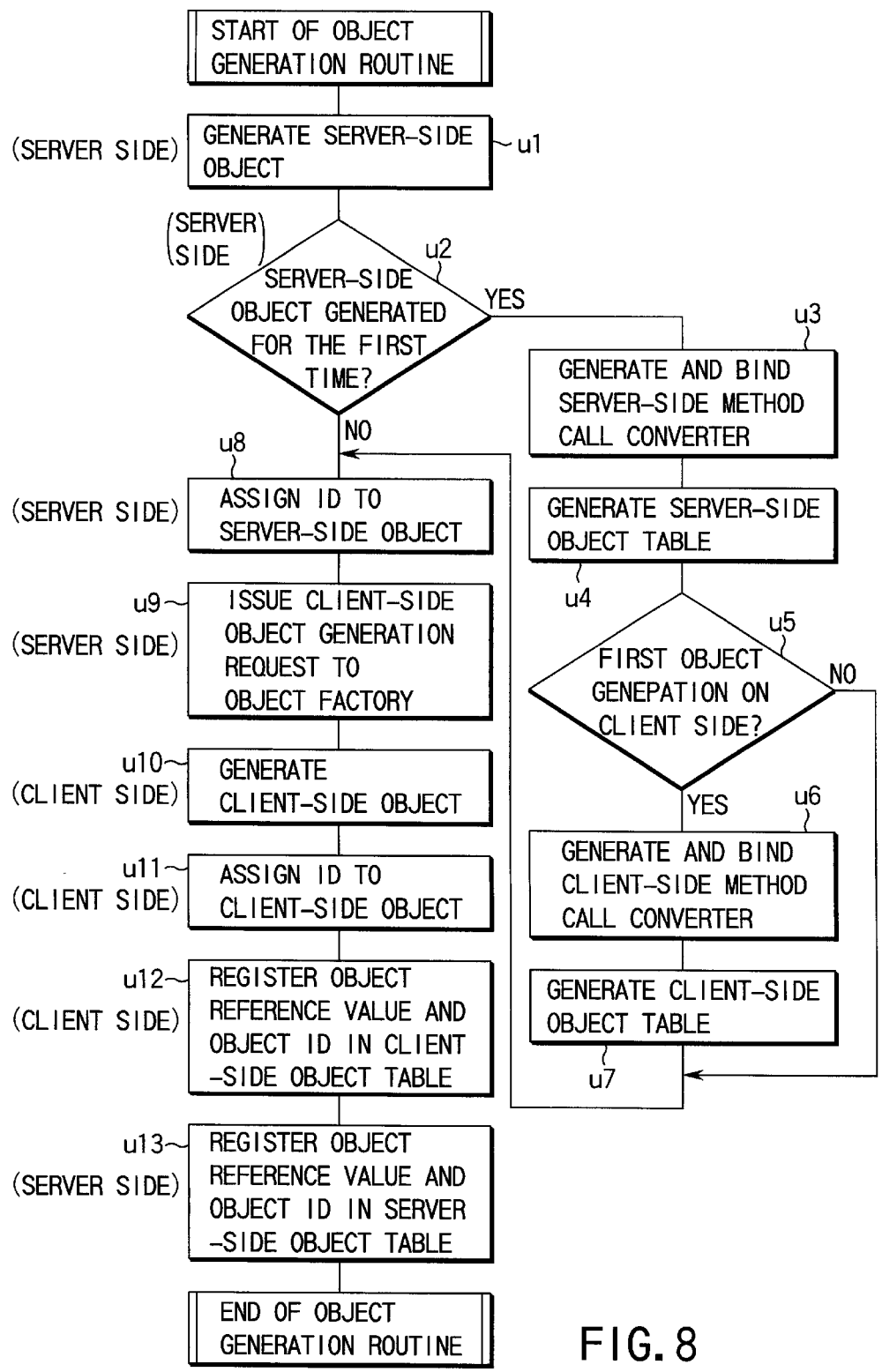
FIG. 8 is a flow chart showing an operation of generating a new server-side object in the object-oriented computer system according to the third embodiment.

FIG. 8 is a flow chart showing an operation (object generation routine) of generating a new server-side object.

When the object generation routine is executed by the application 5, first a server-side object is generated using the server-side class library 6 (u1). It is determined whether the server-side object is an object generated for the first time after the start of the application 5 (u2).

If YES in step u2, the server-side method call converter 27 is generated and bound (u3), and the server-side object table 26 is generated (u4).

It is determined whether the object factory 18 is to be started to generate a first client-side object (u5). If YES in step u5, the client-side method call converter 34 is generated and bound (u6), and the client-side object table 35 is generated (u7).

An object ID is assigned to the generated server-side object (u8). The server-side object transmits, to the object factory 18 on the client 24 side, the client-side object generation request 20 corresponding to the server-side object added with the object ID (u9).

A client-side object is generated by the object factory 18 (u10). The object ID added to the generation request is assigned to the generated client-side object (u11). The assigned object ID and a reference value representing the client-side object are registered in the client-side object table 35 in association with each other (u12).

A reference value representing the generated server-side object and the assigned object ID are registered in the server-side object table 26 in association with each other (u13). With this processing, the same object ID is assigned to the server-side object and corresponding client-side object.

Figure 9:
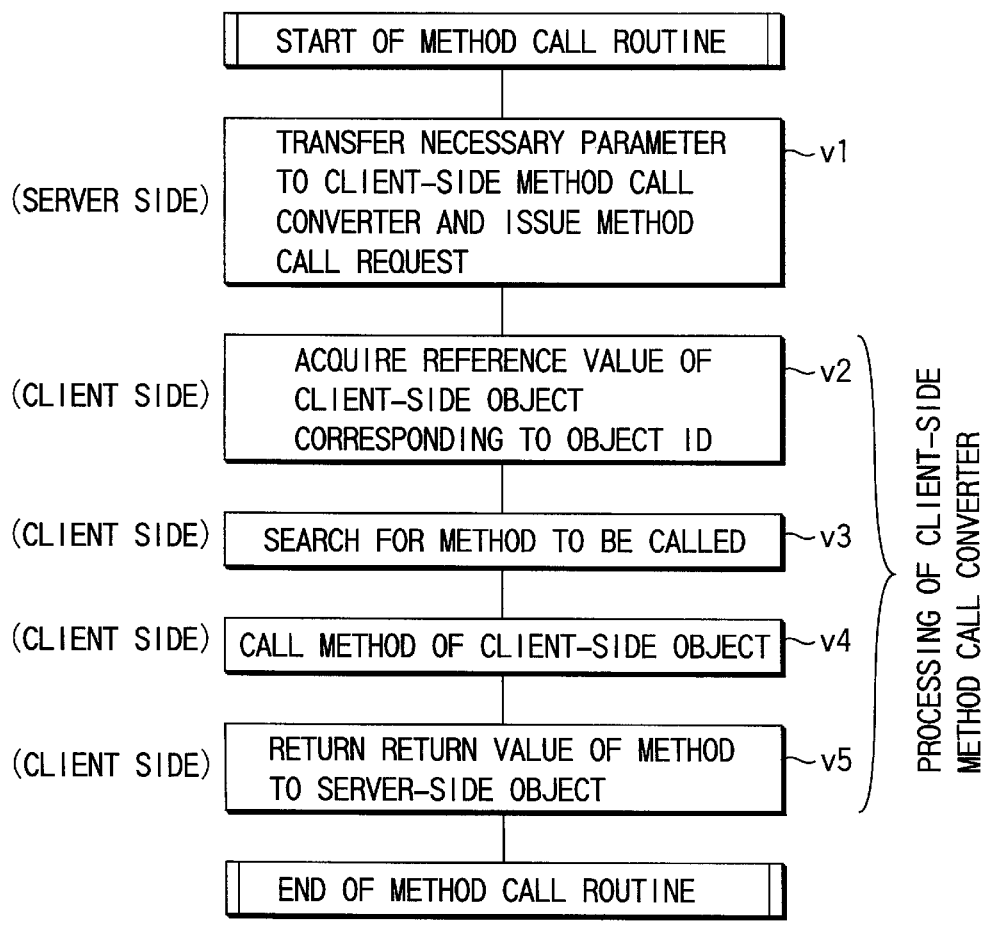
FIG. 9 is a flow chart showing an operation of calling a method on a server-side object in the object-oriented computer system according to the third embodiment.

FIG. 9 is a flow chart showing an operation (object generation routine) of calling a method on a server-side object. The routine of calling a method on a client-side object is the same as this routine, and a detailed description thereof will be omitted.

First, a method call on a server-side object is made by the application 5, information (parameter) of the object ID, class name, called method name, class array representing the type of argument, and argument array of the called server-side object is transmitted from the server-side object to the client-side method call converter 34, and a method call request is issued (v1).

Upon receiving the parameter and method call request, the client-side method call converter 34 acquires the reference value of a client-side object corresponding to the object ID contained in the parameter using the client-side object table 35 (v2).

The client-side method call converter 34 searches for the method to be called on the basis of the acquired reference value, and the class name, method name, and class array representing the type of argument contained in the parameter (v3).

The method found by the search is called by the client-side method call converter 34 (v4), and processing is executed.

A return value obtained by executing this processing is acquired by the client-side method call converter 34 and transmitted to the server-side object that has transmitted the method call request (v5).

As described above, in the object-oriented computer system 21 of this embodiment can obtain the same effect by the same function as in the above-described embodiments.

In this embodiment, the server-side method call converter 27 systematically manages data transmission from a server-side object to the network and data acquisition from the network to the server-side object. For this reason, a port number need be assigned to only this server-side method call converter.

Hence, unlike a case wherein data transmission/reception to/from a client-side object is individually managed by each server-side object, the number of times of port number assignment processing can be decreased, and the number of times of processing of making a server-side object visible from the network can be decreased.

Additionally, in this embodiment, the client-side method call converter is generated for each application on the server side and used. For this reason, the amount of processing of making an object visible from the network can be decreased even on the client side. Furthermore, since inter-object communication of each application is managed by one converter, exclusive control can be facilitated.

In this embodiment, the client-side object table is used for each application on the server side. For this reason, a client-side object corresponding to a server-side object can be obtained, and management of data transmission/reception processing by the client-side method call converter corresponding to each application can be facilitated.

Fourth Embodiment

In this embodiment, an object-oriented computer system in which an application 5 described in the above embodiments is defined by a class that has inherited the class of an existing display library 13, and the server side is notified, through the network, of only a method whose contents are changed or a method newly added at the time of inheritance to execute the method will be described.

Figure 10:
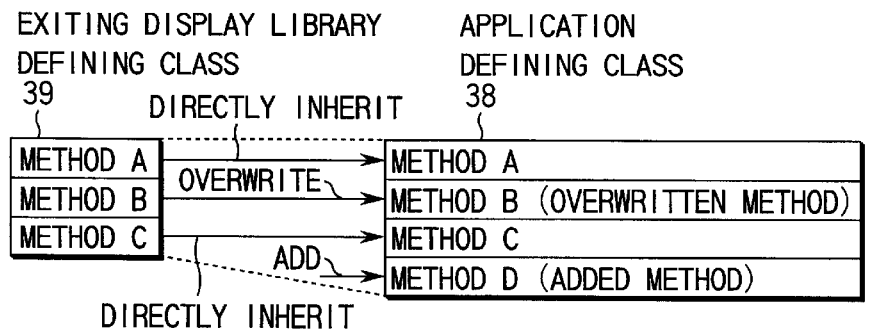
FIG. 10 is a view showing the relationship between a class defining an application and a class defined in an existing display library in an object-oriented computer system according to the fourth embodiment of the present invention.

FIG. 10 is a view showing the relationship between the class defining the application 5 and the class defined in the existing display library 13 in the object-oriented computer system of this embodiment. Another class can also have the same relationship as in FIG. 10.

A class 38 defining the application 5 includes a method B (to be referred to as an "overwritten method" hereinafter) whose processing contents are overwritten (changed) at the time of inheritance of a class 39 defined in the existing display library 13 but whose processing name remains unchanged. The class 38 also includes a method D (to be referred to as an "added method" hereinafter) newly defined at the time of inheritance. Remaining methods A and C included in the class 38 directly inherit the methods A and C of the class 38 defined in the existing display library 13.

Figure 11:
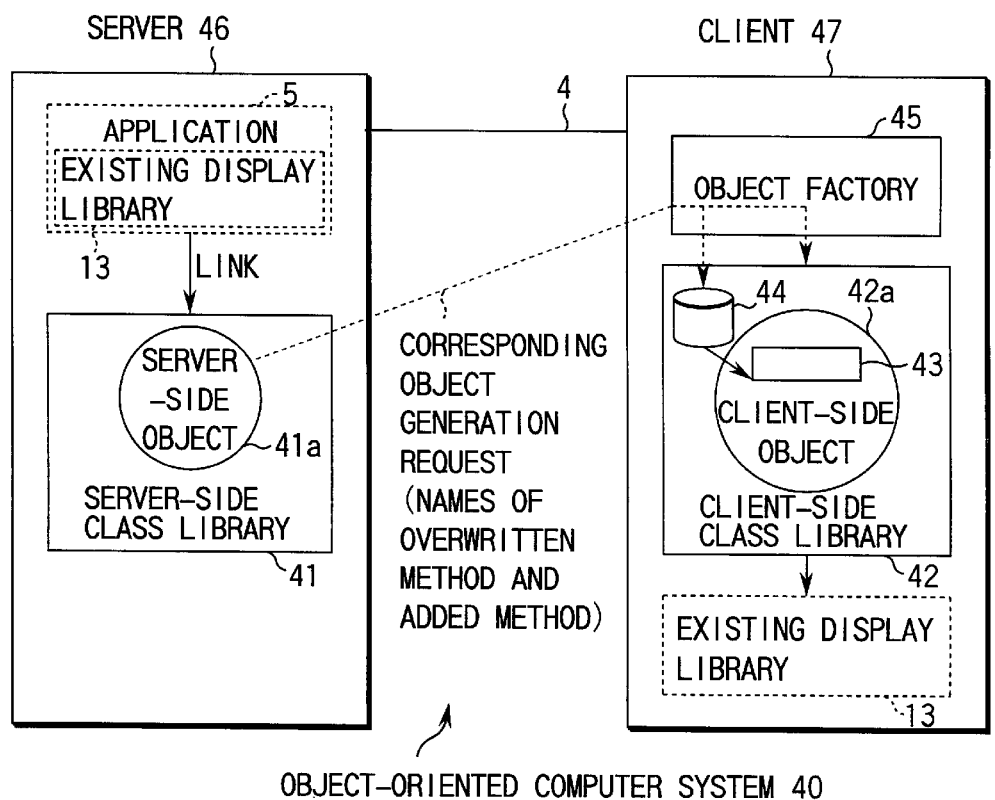
FIG. 11 is a block diagram showing the arrangement of the object-oriented computer system according to the fourth embodiment.

FIG. 11 is a block diagram showing the arrangement of the object-oriented computer system according to the fourth embodiment, which has the application 5 having the above inheritance relationship. The same reference numerals as in the above-described drawings denote the same parts in FIG. 11, and only different parts will be described in detail.

In an object-oriented computer system 40 having a server 46 and client 47, each class of the application 5 is defined by inheriting a class defined in the existing display library 13. Some classes include overwritten methods or added methods.

Hence, methods that are not defined on the client 47 side are present on the server 46 side.

A server-side object 41a including a relay function and generated using a server-side class library 41 causes a corresponding object generation request or parameter to include the names of an overwritten method and added method associated with the server-side object, and notifies the client 47 side of them.

An object factory 45 generates a client-side object 42a using a client-side class library 42 and existing display library 13 on the basis of the corresponding object generation request. In generating the client-side object 42a, the names of the overwritten method and added method included in the corresponding object generation request are stored in a change processing storage section 44.

The client-side object 42a generated using the client-side class library 42 has a change processing requesting function 43 and change processing storage section 44.

When the client-side object 42a is generated, the change processing storage section 44 stores the names of the overwritten method and added method associated with the generated client-side object 42a.

When a method call is received, the change processing requesting function 43 determines by looking up the change processing storage section 44 whether the called method is an overwritten method or added method. If the method is an overwritten method or added method, the call of the overwritten method or added method is transmitted through the server-side object 41a. If the method is neither an overwritten method nor added method, the method of the client-side object 42a is executed.

Processing when a method is called on the client 47 side in the object-oriented computer system 40 having the above arrangement will be described below.

First, the application 5 using the server-side class library 41 generates the server-side object 41a. A corresponding object generation request is issued in accordance with parameter transmission from the server-side object 41a to the object factory 45. In this case, the names of an overwritten method and added method of the application 5, which are associated with the server-side object 41a, are issued together with the corresponding object generation request.

The object factory 45 generates the client-side object 42a using the client-side class library 42 and existing display library 13. The notified names of the overwritten method and added method are stored in the change processing storage section 44 corresponding to the generated client-side object 42a.

When a method included in the client-side object 42a is called on the basis of an event that has occurred on the client 47 side, the change processing requesting function 43 determines whether the called method is an overwritten or added method by looking up the contents of the change processing storage section 44, which corresponds to the client-side object 42a.

If it is determined that an overwritten or added method is called, the overwritten or added method on the server 46 side is called by the client-side object 42a through the corresponding server-side object 41a and executed. A return value is transmitted to the client-side object 42a through the server-side object 41a.

If it is determined that the method is neither an overwritten nor added method, the method of the client-side object 42a itself is executed, and a return value is obtained.

Figure 12A:
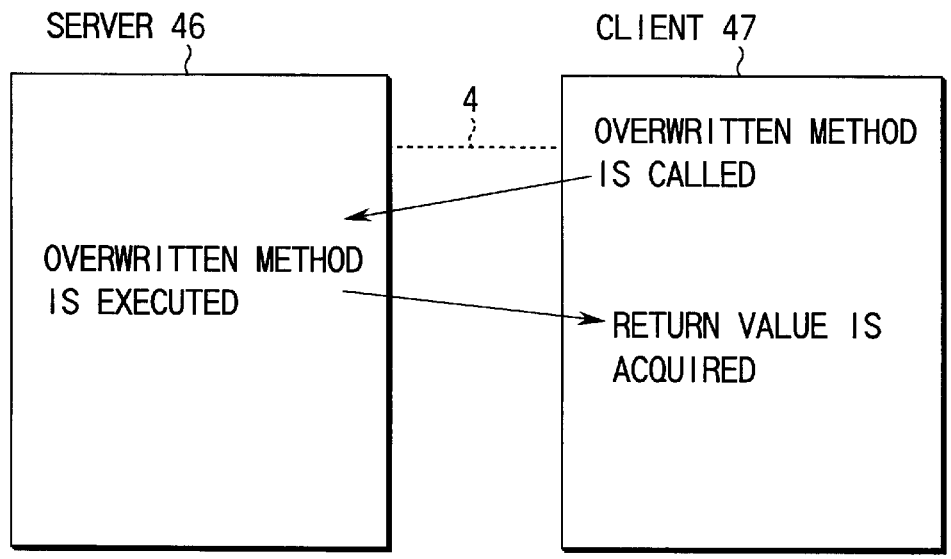
FIGS. 12A and 12B are views showing the operation contents of a server and client when a method is called on the client side in the object-oriented computer system according to the fourth embodiment.
Figure 12B:
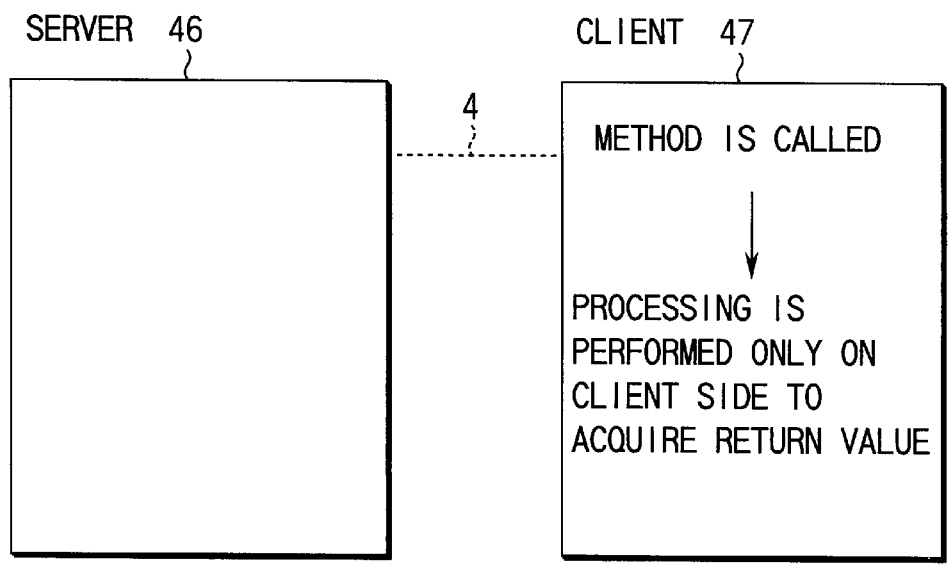

FIGS. 12A and 12B are views showing the operation contents of the server 46 and client 47 when a method is called on the client 47 side.

FIG. 12A shows a case wherein an overwritten method or added method is called. When an overwritten method is called on the client 47 side, the overwritten method on the server 46 is called through the network 4, and a return value is obtained. The return value is transmitted from the server 46 side to the client 47 side, and the return value is acquired on the client 47 side.

FIG. 12B shows a case wherein a method that is neither an overwritten method nor added method is called. When the method is called on the client side, a corresponding method is directly executed, and a return value is obtained only by processing on the client side.

As described above, in the object-oriented computer system 40 of this embodiment, a class defined in the existing display library is inherited, and some methods are changed at the time of inheritance to define the class of the application 5.

In the object-oriented computer system 40 of this embodiment, only when a method changed or newly added at the time of inheritance is called on the client 47 side, the method on the server 46 side is called through the network 4. However, when a method that has been inherited without any change is called on the client 47 side, the method on the client 47 side is executed.

Hence, in this embodiment, since the frequency of method calls through the network 4 can be decreased, methods can be efficiently called at a high speed, and the network utilization rate can be reduced.

In this embodiment, an example wherein one server-side object and one client-side object are generated has been described for the descriptive convenience. However, the present invention is not limited to this. More specifically, a plurality of server-side objects and client-side objects may be generated as far as overwritten methods and added methods associated with the objects can be confirmed.

In this embodiment, each client-side object has a change processing requesting function. However, a section for systematically managing the change processing requesting operations may be provided.

In this embodiment, a case wherein an overwritten method or added method is generated on the server side has been described. Conversely, an overwritten method or added method generated on the client side may be called through the network.

Fifth Embodiment

In this embodiment, an object-oriented computer system in which the class of a server-side class library and the class of a client-side class library are defined by inheriting classes defined in an existing display library will be described.

A case of an undistributed program will be described.

Figure 13:
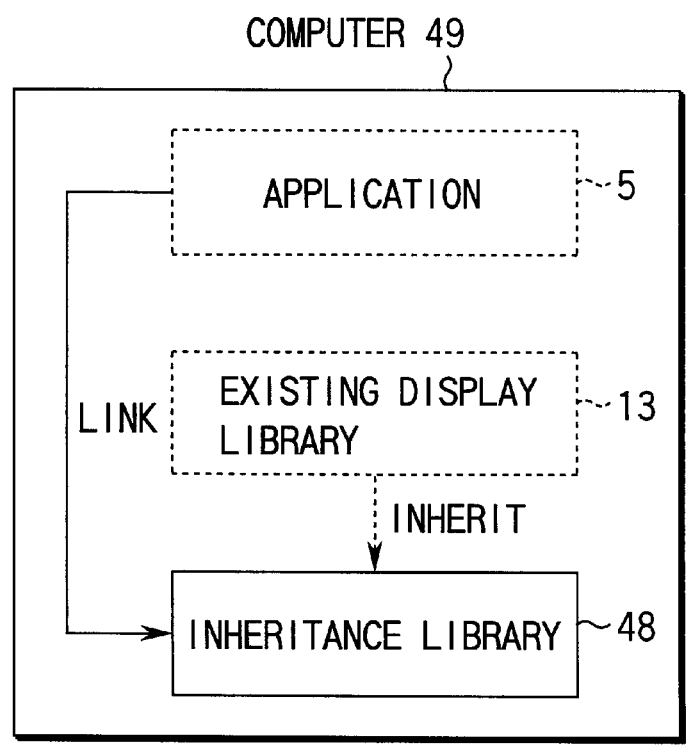
FIG. 13 is a block diagram showing the arrangement of a computer having an inheritance class that has inherited an existing display class in the fifth embodiment.

As shown in FIG. 13, a computer 49 has an application 5, an existing display library 13, and an inheritance library 48 constructed by an inheritance class that has inherited a class (to be referred to as an "existing display class" hereinafter) defined in the existing display library 13. In the computer 49, the inheritance library 48 is linked to the application 5.

Figure 14:
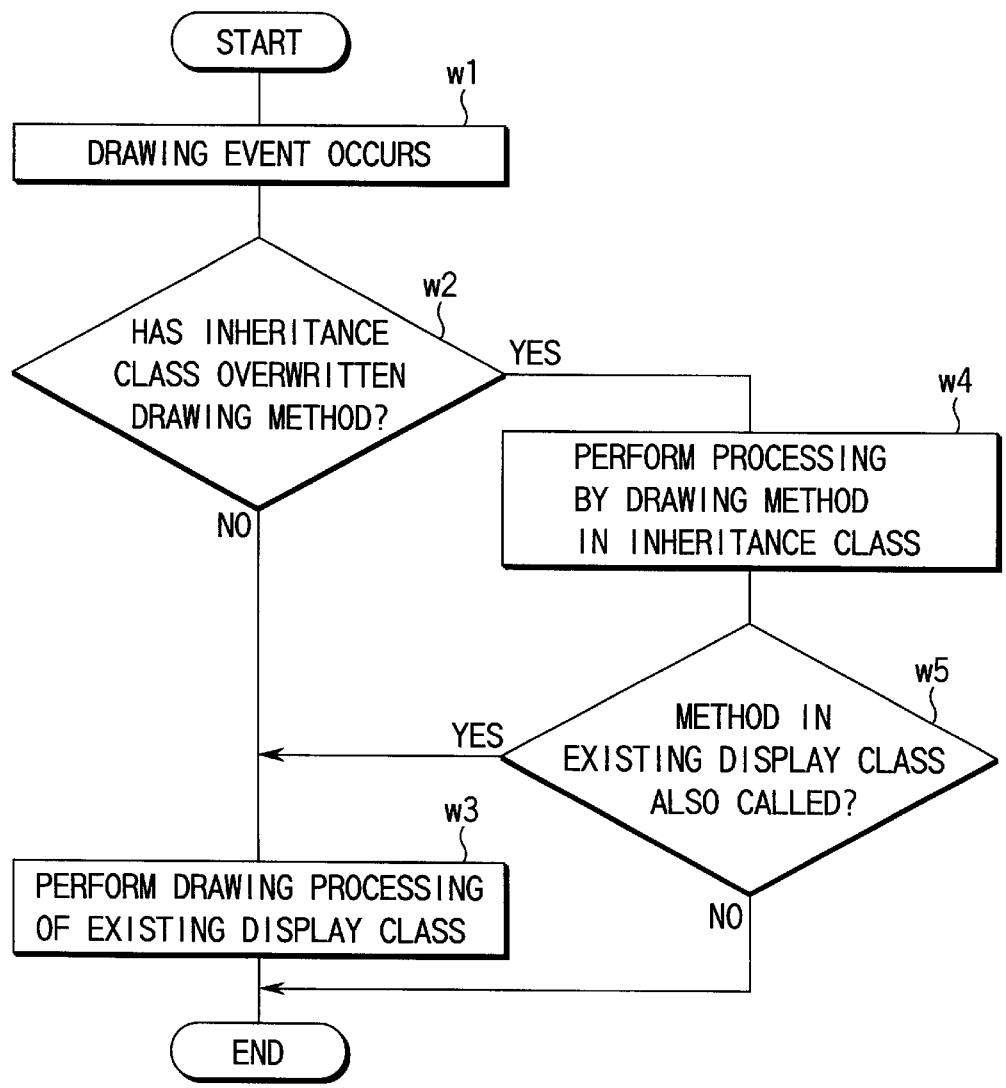
FIG. 14 is a flow chart showing processing when an object based on the inheritance class is generated, and a predetermined drawing method is called on this object in the fifth embodiment.

FIG. 14 is a flow chart showing processing when an object based on the inheritance class is generated in the computer 49, and a predetermined drawing method of this object is called.

When a drawing event occurs (w1), it is determined whether a drawing method called on the basis of this event is a method overwritten when the inheritance class is defined by inheriting the existing display class (w2).

If NO in step w2, a method defined in the existing display class is called, and processing (e.g., drawing processing such as button display) defined in this existing display class is executed (w3).

If YES in step w2, the drawing method defined in the inheritance class is called, and processing is executed (w4). If, in the processing by the called drawing method, a method defined in the existing display class is also called (w5), the called method of the existing display class is called, and processing is executed (w3).

It is an object of this embodiment to cause the object-oriented computer system which operates by distributing objects to execute the same processing as that for such an undistributed program.

Figure 15:
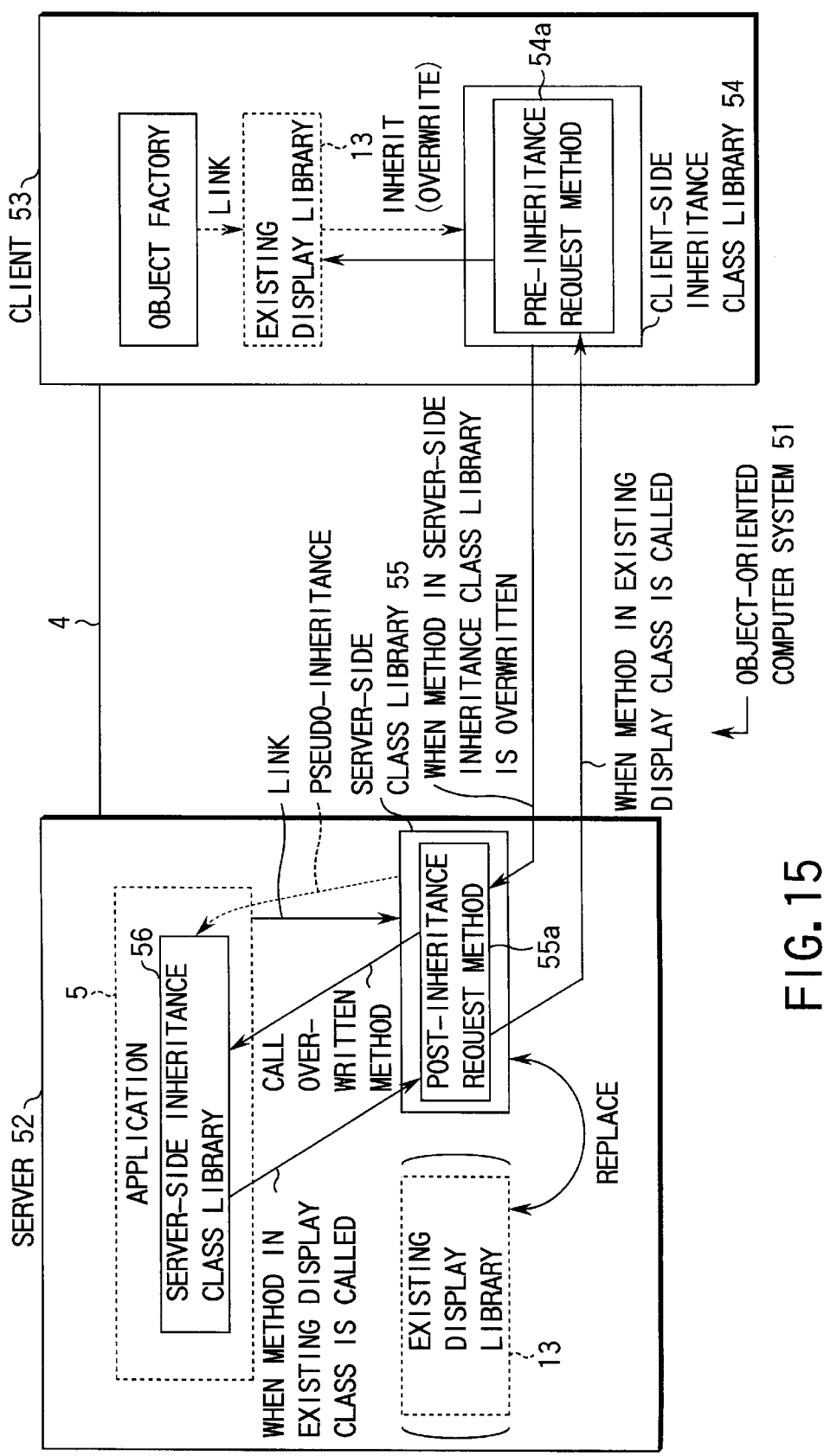
FIG. 15 is a block diagram showing the arrangement of an object-oriented computer system according to the fifth embodiment of the present invention.

FIG. 15 is a block diagram showing the arrangement of the object-oriented computer system of this embodiment. The same reference numerals as in the above-described drawings denote the same parts in FIG. 15, and a detailed description thereof will be omitted, or only a brief description will be made. In this case, only different parts will be described in detail.

In an object-oriented computer system 51, an existing display library 13 is provided on the client 53 side. Referring to FIG. 15, the existing display library 13 is exemplarily illustrated on the server 52 side so as to indicate that a server-side class library 55 replaces the existing display library 13. Actually, the existing display library 13 is provided only on the client 53 side.

A client-side inheritance class library 54 is constructed by a class that has inherited a class defined by the existing display library 13. In addition, a predetermined method is overwritten at the time of this class inheritance.

In the client-side inheritance class library 54, a pre-inheritance request method 54a (predetermined processing group requesting means) for calling the method of the class defined in the existing display library 13 is defined.

A server-side inheritance class library 56 is constructed by a class that has inherited a class defined in the existing display library 13. In addition, a predetermined method is overwritten at the time of this class inheritance.

The server-side class library 55 has the same function as that of each server-side class library described above and is compatible with the existing display library 13 in its relationship to an external application.

Hence, the server-side class library 55 and existing display library 13 can be externally accessed. In the server-side class library 55, a post-inheritance request method 55a for calling the method overwritten at the time of definition of the server-side inheritance class library 56 is defined.

Processing executed in the object-oriented computer system 51 of this embodiment having the above arrangement will be described below.

Figure 16:
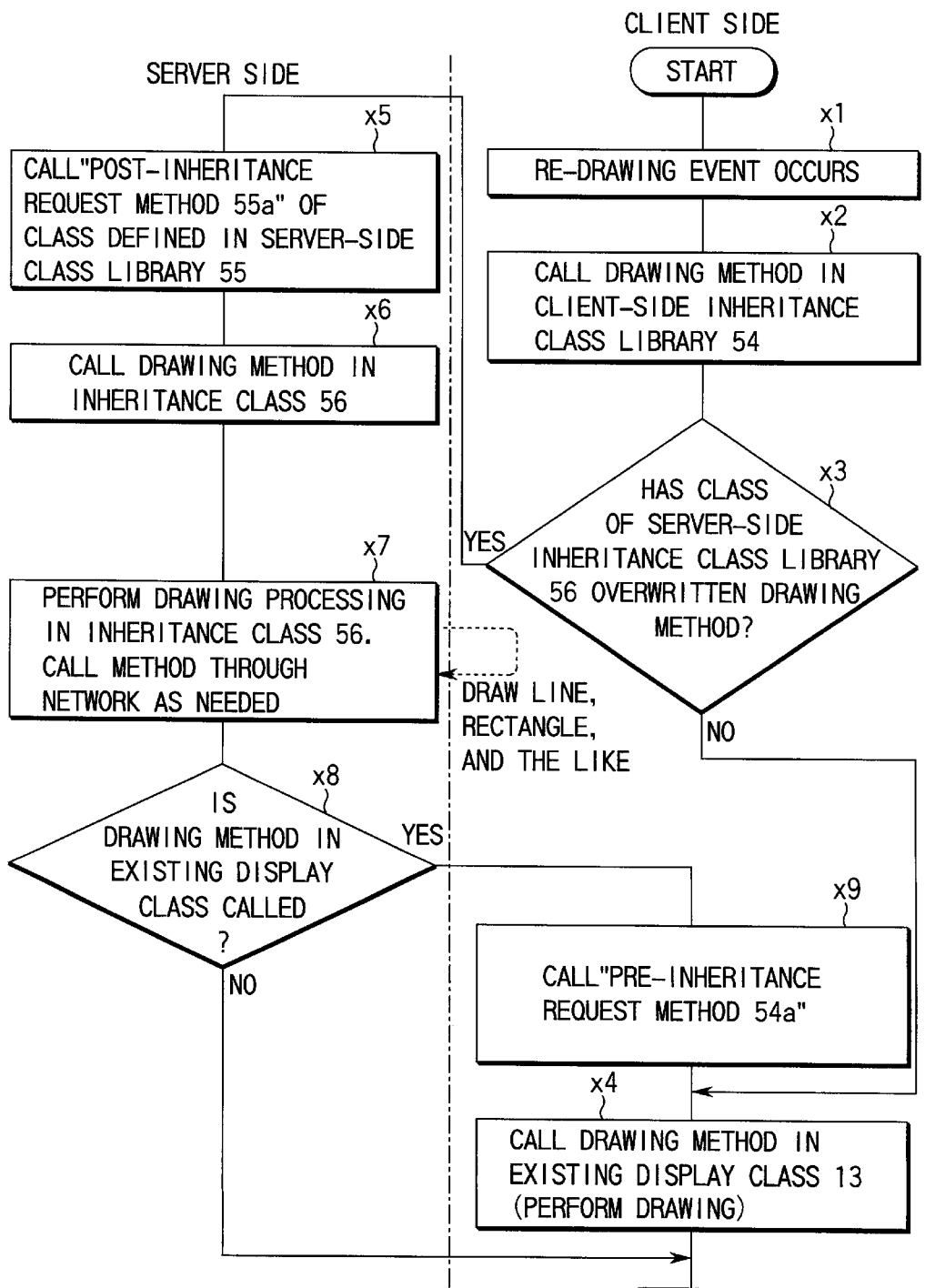
FIG. 16 is a flow chart showing the flow of processing when a method is called on the client side in the object-oriented computer system according to the fifth embodiment.

FIG. 16 is a flow chart showing the flow of processing when a method is called on the client side in the object-oriented computer system 51.

When a re-drawing event for a client-side object occurs (x1), a drawing method defined in the client-side inheritance class is called (x2).

It is determined whether the called drawing method is a method overwritten at the time of inheritance in defining the server-side inheritance class library 56 (x3). To determine this, a method of notifying the client side of the added method in advance can be applied, as described above.

If NO in step x3, a drawing method defined in the existing display library 13 on the client 53 side is called, and drawing processing is executed (x4).

If YES in step x3, the post-inheritance request method 55a defined in the class of the server-side class library 55 is called (x5), so an overwritten drawing method (drawing method of the overwritten inheritance class) defined in the class of the server-side inheritance class library 56 is called (x6).

In drawing processing executed by calling the overwritten method, a method on the client 53 side is also called through the network 4 as needed (x7). If, in the drawing method of the inheritance class, the drawing method of the existing display class is also called (x8), the pre-inheritance request method 54a defined in the class of the client-side inheritance class library 54 is called by a method defined in the class of the server-side class library 55 (x9).

The drawing method (drawing method of the existing display class) defined in the class of the existing display library 13 on the client 53 side is called by the pre-inheritance request method 54a, and drawing processing is executed (x4).

As described above, in the object-oriented computer system 51 according to this embodiment, when a method overwritten on the server 52 side at the time of inheritance is called on the client 53 side, the overwritten method is called through the network 4. On the other hand, when a method that is not overwritten is called on the server 52 side or client 53 side, the method defined in the existing display library 13 on the client 53 side is called.

With this arrangement, when the client-side inheritance class library 54 that has inherited the existing display library 13 is used on the server 52 side, the same processing as for an undistributed program can be realized.

The contents described in the above embodiment can be applied to any one of the object-oriented computer systems described in the above embodiments.

In this embodiment, a case wherein a drawing method is called has been described. However, the present invention is not limited to this and can also be realized for another method.

The object-oriented computer systems of the above-described embodiments can be combined and applied.

Even in a normal client/server system, the same function and effect as in the present invention can be obtained by providing the client-side class library, server-side class library, and object factory described in the above embodiments.

In the above embodiments, a library is used for display. However, the present invention is not limited to this, and a library may be used for another application purpose.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object-oriented computer system comprising:
    a server-side class library which is applied to generate a server-side object which relays a processing request from an application program on a server to a client, the server-side class library being linked to the application program and compatible with an existing library which can be linked to the application program, wherein the application program is an undistributed program being developed by an application developer;
    a client-side class library which is applied to generate a client-side object which actually executes processing on the basis of the processing request relayed by the server-side object, the client-side class library inheriting the existing library; and
    an object generation section which, when the server-side object is generated by applying the server-side class library and executing the application program, generates the client-side object by applying the client-side class library corresponding to the generated server-side object.

2. A system according to claim 1, wherein the client-side object includes a change processing requesting section that notifies the server of an execution request for a changed method on the server by a class inheritance.

3. A system according to claim 1, wherein the client-side object includes a change processing requesting section that notifies the server of an execution request for a newly added method on the server.

4. A system according to claim 1, further comprising:
    a post-inheritance request section which, when a process of the existing library is requested by the application program, requests the client to execute the requested process.

5. A system according to claim 1, further comprising:
    a distribution section on the server, which executes processing of sending message contents from the server-side object to the client-side object via a network connecting the server and client, executes acquiring of the message contents from the client-side object to the server-side object via the network, and distributes the message contents to the corresponding server-side object.

6. A system according to claim 1, further comprising:
    a table for managing the server-side object and the client-side object corresponding to the server-side object in association with each other; and
    a distribution section on the server, which executes processing of sending message contents from the server-side object to the client-side object via a network connecting the server and client, executes acquiring the message contents from the client-side object to the server-side object from the network, and distributes the message contents to the corresponding server-side object, on the basis of management contents of the table.

7. A system according to claim 1, further comprising:

a distribution section on the client, which executes processing of sending message contents from the client-side object to the server-side object via a network connecting the server and client, and executes processing of acquiring message contents from the server-side object to the client-side object from the network and distributing the message contents to the corresponding client-side object.

8. A system according to claim 1, further comprising:

a table for managing a server-side object and the client-side object corresponding to the server-side object in association with each other; and distribution section on the client, which executes processing of sending message contents from the client-side object to the server-side object to a network connecting the server and client, and executes processing of acquiring message contents from the server-side object to the client-side object from the network and distributing the message contents to the corresponding client-side object, on the basis of management contents of the table.

9. A computer-readable storage medium which stores a program for controlling an object-oriented computer system, comprising:

a server-side class library which is applied to generate a server-side object which relays a processing request from an application program on a server to a client, the server-side class library being linked to the application program and being compatible with an existing library which can be linked to the application program, wherein the application program is an undistributed program being developed by an application developer, a client-side class library which is applied to generate a client-side object which actually executes processing on the basis of the processing request relayed by the server-side object, the client-side class library inheriting the existing library, and an object generation section which, when the server-side object is generated by applying the server-side class library by executing the application program, generates the client-side object applying the client-side class library corresponding to the generated server-side object.

10. A computer-readable storage medium according to claim 9, wherein the client-side object includes a change processing requesting section that notifies the server of an execution request for a changed method on the server by a class inheritance.

11. A computer-readable storage medium according to claim 9, wherein the client-side object includes a change processing requesting section that notifies the server of an execution request for a newly added method on the server.

12. A computer-readable storage medium according to claim 9, further comprising:

a post-inheritance request section which, when a process of the existing library is requested in a process by the application program, requests the client to execute the requested process.

13. A computer-readable storage medium according to claim 9, further comprising:

a distribution section on the server, which executes processing of sending message contents from the server-side object to the client-side object to a network connecting the server and client, and executes processing of acquiring message contents from the client-side object to the server-side object from the network and distributing the message contents to the corresponding server-side object.

14. A computer-readable storage medium according to claim 9, further comprising a distribution section on the client, which executes processing of sending message contents from the client-side object to the server-side object to a network connecting the server and client, and executes processing of acquiring message contents from the server-side object to the client-side object from the network and distributing the message contents to the corresponding client-side object.

\* \* \* \* \*

UNITED STATES PATENT AND TRADEMARK OFFICE
CERTIFICATE OF CORRECTION

PATENT NO. : 6,678,742 B1
DATED : January 13, 2004
INVENTOR(S) : Muramatsu et al.

It is certified that error appears in the above-identified patent and that said Letters Patent is hereby corrected as shown below:

Column 21,
Line 14, change "distribution section" to -- a distribution section --.

Signed and Sealed this

Thirteenth Day of April, 2004

JON W. DUDAS
*Acting Director of the United States Patent and Trademark Office*